United States Patent
Schacher et al.

(10) Patent No.: US 8,359,298 B2
(45) Date of Patent: Jan. 22, 2013

(54) METHOD, SYSTEM, AND PROGRAM PRODUCT FOR MANAGING ADAPTER ASSOCIATION FOR A DATA GRAPH OF DATA OBJECTS

(75) Inventors: Ritchard L. Schacher, Cary, NC (US); Matthew J. Hicks, Morrisville, NC (US); Eduardus A. T. Merks, Ballantrae (CA)

(73) Assignee: International Business Machines Corporation, Armonk, NY (US)

( * ) Notice: Subject to any disclaimer, the term of this patent is extended or adjusted under 35 U.S.C. 154(b) by 1653 days.

(21) Appl. No.: 11/396,673

(22) Filed: Apr. 3, 2006

(65) Prior Publication Data

US 2007/0233722 A1    Oct. 4, 2007

(51) Int. Cl.
*G06F 17/30* (2006.01)

(52) U.S. Cl. ........................................................ 707/705

(58) Field of Classification Search .................. 707/705
See application file for complete search history.

(56) References Cited

U.S. PATENT DOCUMENTS

| | | | |
|---|---|---|---|
| 5,321,816 A | 6/1994 | Rogan et al. | |
| 6,029,177 A | 2/2000 | Sadiq et al. | |
| 6,182,155 B1 | 1/2001 | Cheng et al. | |
| 6,275,985 B1 | 8/2001 | Ungar et al. | |
| 6,292,933 B1 | 9/2001 | Bahrs et al. | |
| 6,356,946 B1 | 3/2002 | Clegg et al. | |
| 6,438,559 B1 | 8/2002 | White et al. | |
| 6,578,191 B1 | 6/2003 | Boehme et al. | |
| 6,763,395 B1 | 7/2004 | Austin | |
| 6,775,678 B1 | 8/2004 | Hillberg et al. | |
| 6,928,488 B1 * | 8/2005 | de Jong et al. | 709/246 |
| 7,016,953 B2 | 3/2006 | Lemon | |
| 7,039,624 B1 | 5/2006 | Merk et al. | |
| 7,120,698 B2 | 10/2006 | Krishnapuram et al. | |
| 2003/0105857 A1 | 6/2003 | Kamen et al. | |
| 2003/0191803 A1 * | 10/2003 | Chinnici et al. | 709/203 |
| 2004/0015829 A1 | 1/2004 | Mullins et al. | |
| 2004/0015847 A1 | 1/2004 | Berg et al. | |
| 2004/0088117 A1 | 5/2004 | Dorsett Jr. | |
| 2004/0139396 A1 | 7/2004 | Gelernter et al. | |
| 2004/0177093 A1 | 9/2004 | Mullins | |
| 2004/0210909 A1 | 10/2004 | Dominguez, Jr. et al. | |
| 2004/0215612 A1 | 10/2004 | Brody | |
| 2005/0149911 A1 | 7/2005 | Nadon et al. | |
| 2005/0188353 A1 | 8/2005 | Hasson et al. | |
| 2005/0276570 A1 | 12/2005 | Reed, Jr. et al. | |
| 2006/0004802 A1 | 1/2006 | Phillips et al. | |

(Continued)

OTHER PUBLICATIONS

PTO "Office Action", Mail Date Mar. 20, 2008, U.S. Appl. No. 11/420,868, filed May 30, 2006.

(Continued)

*Primary Examiner* — Thu-Nguyet Le
(74) *Attorney, Agent, or Firm* — Cuenot, Forsythe & Kim, LLC

(57) ABSTRACT

The present invention provides a method, system, and program product for managing adapter association for a data graph of data objects. Specifically, under the present invention, a data graph of data objects is generated (e.g., on a server), and then serialized. In performing the serialization, the data graph is translated into bits. In one embodiment, the bits are communicated to a client over a network, and then translated back into the data graph (i.e., deserialized). An adapter is associated with each of the data objects after the data graph is deserialized. This avoids the "overhead" involved with associating and having active adapters during deserialization.

6 Claims, 6 Drawing Sheets

U.S. PATENT DOCUMENTS

| | | |
|---|---|---|
| 2006/0195779 A1 | 8/2006 | McElroy et al. |
| 2006/0206502 A1 | 9/2006 | Gaurav et al. |
| 2006/0206503 A1 | 9/2006 | Gaurav et al. |
| 2006/0206523 A1 | 9/2006 | Gaurav et al. |
| 2007/0282863 A1 | 12/2007 | Schacher et al. |
| 2008/0120311 A1 | 5/2008 | Reed et al. |
| 2008/0120312 A1 | 5/2008 | Reed et al. |

OTHER PUBLICATIONS

PTO "Final Office Action", Mail Date Aug. 27, 2008, U.S. Appl. No. 11/420,868, filed May 30, 2006.

PTO "Office Action", Mail Date Jan. 26, 2009, U.S. Appl. No. 11/420,868, filed May 30, 2006.

PTO "Final Office Action", Mail Date Jul. 9, 2009, U.S. Appl. No. 11/420,868, filed May 30, 2006.

PTO "Office Action", Mail Date Jul. 21, 2008, U.S. Appl. No. 11/421,250, filed May 31, 2006.

PTO "Office Action", Mail Date Dec. 12, 2008, U.S. Appl. No. 11/421,250, filed May 31, 2006.

PTO "Office Action", Mail Date Mar. 4, 2009, U.S. Appl. No. 11/421,250, filed May 31, 2006.

Marechaux, "Simplify and unify data with a Service Date Objects architecture", Sep. 13, 2005, 11 pages, http://www.ibm.com/developerworks/webservices/library/ws-sdoarch/.

Portier et al., "Introduction to Service Data Objects", Sep. 28, 2004, 14 pages, http://www.ibm.com/developerworks.java/library/j-sdo/.

BEA Systems, Inc. et al., "Service Data Objects for Java Specification", Nov. 2006, Version 2.1.0, 140 pages, http://www.osoa.org/display/Main/Service+Data+Ojbects+Specifications.

Simon Laws, "PHP and SDO White Paper", Oct. 2006, 3 pages, http://www.osoa.org/display/PHP/PHP+and+SDO+White+Paper.

Anonymous, "Service Data Objects White Paper", Mar. 2007, Version 2.1, 16 pages, http://www.osoa.org/display/Main/Terms+and+Conditions.

BEA Systems Inc. et al., "Next-Generation Data Programming: Service Data Objects", Nov. 2003, 15 pages, http://www.osoa.org/download/attachments/791/Next-Gen-Data-Programming-Whitepaper.pdf?version=1.

Eclipse, "Eclipse Modeling Framework (EMF)", 3 pages, http://www.eclipse.org/emf/.

JSR 235: Service Data Objects, "JSRs: Java Specification Requests", http://www.jcp.ort/en/jsr/detail?id=235, 11 pages.

IBM and BEA, "Service Data Objects, WorkManager, and Timers", IBM and BEA Joint Specifications Overview, Nov. 2005, 3 pages, http://www.-128.ibm.com/developerworks/library/specification/j-c . . . .

Kurotsuchi, "The Wonders of Java Object Serialization", 1998, 9 pages, ACM, http://www.acm.org/crossroads/xrds4-2/serial.html1.

Sun Microsystems, Inc. "Java Object Serialization Specification", Feb. 1997, Rev. 1.3, 54 pages, http://ftp.ncnu.edu.tw/JavaDownload/Docs/JDK1.1/serial-spec.pdf.

\* cited by examiner

METHOD, SYSTEM, AND PROGRAM PRODUCT FOR MANAGING ADAPTER ASSOCIATION FOR A DATA GRAPH OF DATA OBJECTS

BACKGROUND OF THE INVENTION

1. Field of the Invention

The present invention generally relates to adapter association management. Specifically, the present invention relates to a method, system, and program product for managing adapter association for a data graph of data objects.

2. Related Art

The Service Data Object (SDO) specification is gaining wide-spread adoption in service-oriented architectures. Within the SDO specification, a data graph is provided. A data graph is generally a graph of related objects. For example, for an electronic file system, a hierarchical data graph can be generated in which individual data objects are represented and interrelated with one another. It is common for a data graph to be serialized on a server, and then deserialized by a client (or vice versa). In remote and/or distributed environments, the speed of serialization operations is often a bottleneck. To this extent, in environments such as clustered J2EE environments, where sessions are constantly synchronized between different nodes, the performance of serialization becomes critical. Serializing SDOs adds an additional challenge because of the adapter framework available through the Eclipse Modeling Framework (EMF). Under this framework, adapters are associated with each data object in the data graph. EMF adapters add extended behavior to various instances of data to provide transient calculations, maintain data integrity, and augment behavior in some way. In general, adapters are "listeners" for the EMF objects that receive notifications of individual modification events. Unfortunately, current approaches associate adapters to data objects as the data graph is being deserialized. This not only decreases the performance of deserialization because the adapters are associated as the graph is being deserialized, but also because the adapters are active once associated. As such, the adapters will receive and process modification notifications during the deserialization operation.

In view of the foregoing, there exists a need for a solution that overcomes the deficiencies in the related art.

SUMMARY OF THE INVENTION

In general, a method, system, and program product for managing adapter association for a data graph of data objects is provided. Specifically, under the present invention, a data graph of data objects is generated (e.g., on a server), and then serialized. In performing the serialization, the data graph is translated into bits. In one embodiment, the bits are communicated to a client over a network, and then translated back into the data graph (i.e., deserialized). An adapter is associated with each of the data objects after the data graph is completely deserialized. This avoids the "overhead" involved with associating and having active adapters during deserialization.

A first aspect of the present invention provides a method for managing adapter association for a data graph of data objects, comprising: deserializing the data graph of data objects; and associating an adapter with each of the data objects after the data graph is deserialized.

A second aspect of the present invention provides a system for managing adapter association for a data graph of data objects, comprising: a system for deserializing the data graph of data objects; and a system for associating an adapter with each of the data objects after the data graph is entirely deserialized.

A third aspect of the present invention provides a program product stored on a computer readable medium for managing adapter association for a data graph of data objects, the computer useable medium comprising program code for causing a computer system to perform the following steps: deserializing the data graph of data objects; and associating an adapter with each of the data objects after the data graph is entirely deserialized.

A fourth aspect of the present invention provides a method for deploying an application for managing adapter association for a data graph of data objects, comprising: providing a computer infrastructure being operable to: deserialize the data graph of data objects; and associate an adapter with each of the data objects after the data graph is deserialized.

Therefore, the present invention provides a method, system, and program product for managing adapter association for a data graph of data objects.

BRIEF DESCRIPTION OF THE DRAWINGS

These and other features of this invention will be more readily understood from the following detailed description of the various aspects of the invention taken in conjunction with the accompanying drawings in which.

Figure 1:
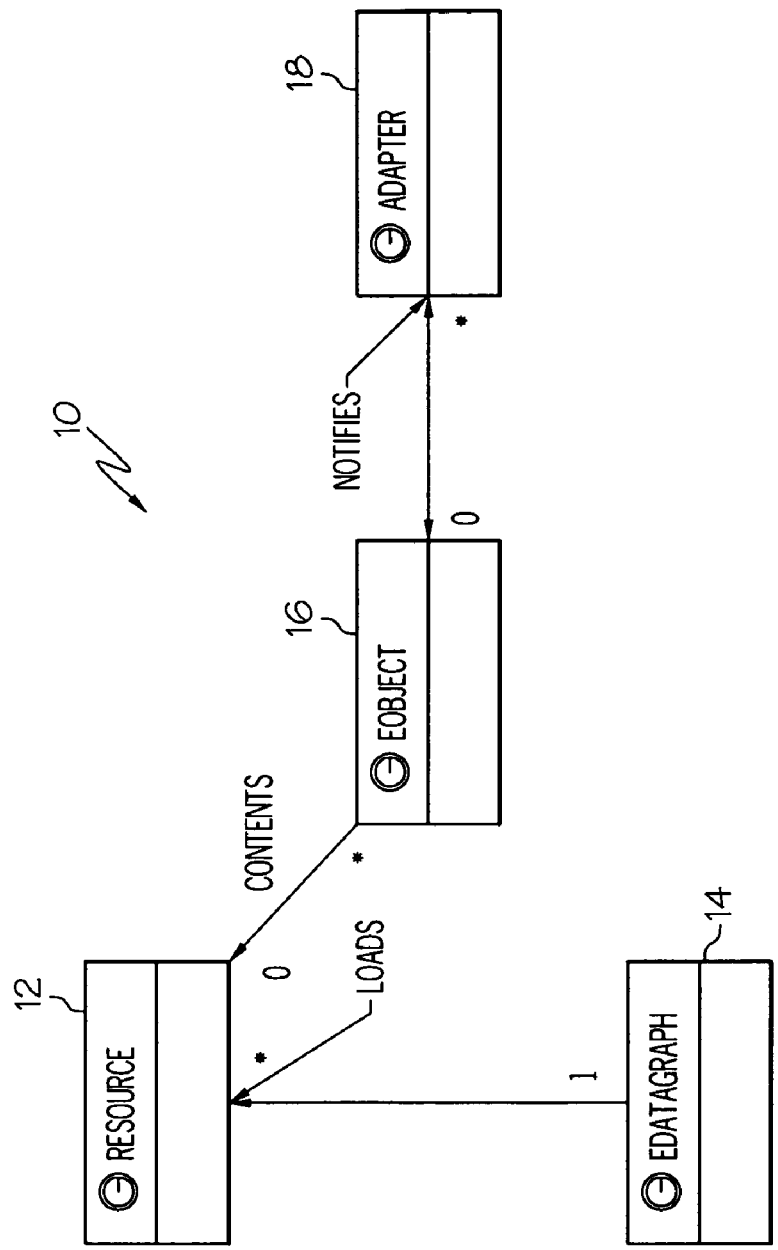
FIG. 1 depicts the relationship among adapters and data objects in accordance with the prior art.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and program product for managing adapter association for a data graph of data objects. Specifically, under the present invention, a data graph of data objects is generated (e.g., on a server), and then serialized. In performing the serialization, the data graph is translated into bits. In one embodiment, the bits are communicated to a client over a network, and then translated back into the data graph (i.e., deserialized). An adapter is associated with each of the data objects after the data graph is completely deserialized. This avoids the "overhead" involved with associating and having active adapters during deserialization.

It should be understood that in a typical embodiment, the present invention serializes and deserializes a data graph over a network between a server and a client. Under this embodiment, the data represented by the data objects of the data graph is typically that produced/used by a distributed application. It should also be appreciated, however, that other implementations could exist. For example, the present invention could be implemented using a single computer system by serializing and deserializing a data graph to memory (e.g., a disk, RAM, etc.).

Referring now to FIG. 1, a diagram 10 depicting the relationship between an adapter and a data object is shown. As shown, a distributed application loads a data graph 14, which is a hierarchical representation of data objects 16. Within some implementations, such as that provided by the EMF, the data graph loads one or more resources 12, the contents of which are data objects 16. Specifically, assume that data graph 14 corresponds to an organizational hierarchy, or the like. Within an organization there is typically a hierarchy of departments and employees. Each department and employee is represented in the data graph 14 with a corresponding data object 16, with employees being children of departments. In many environments/frameworks, an adapter 18 is associated with each data object 16 (e.g., a unique adapter could be associated with each data object 16, or adapters could be shared by multiple data objects 16). Each adapter 18 "listens" for changes to its corresponding data object 16. Specifically, as its corresponding data object 16 is modified, the adapter 18 will receive and process an associated notification. This function is well known in the art and will not be described in detail herein.

In instances involving remote or distributed environments, a data graph 14 will be serialized on a server. This operation involves translating data graph 14 into (data) bits. Once translated, the data bits are communicated to the client, where they are deserialized or translated back into data graph 14 (i.e., the data graph 14 is reconstructed on the client). The goal is to have an exact replica of data graph 14 on the client. Within the context of an operation, (for example, a user transaction that modifies data), the data graph is updated locally, serialized, communicated to the server, and then deserialized on the server. As indicated above, one issue that arises with these operations is the manner in which adapter 18 association and activation are handled.

Figure 2:
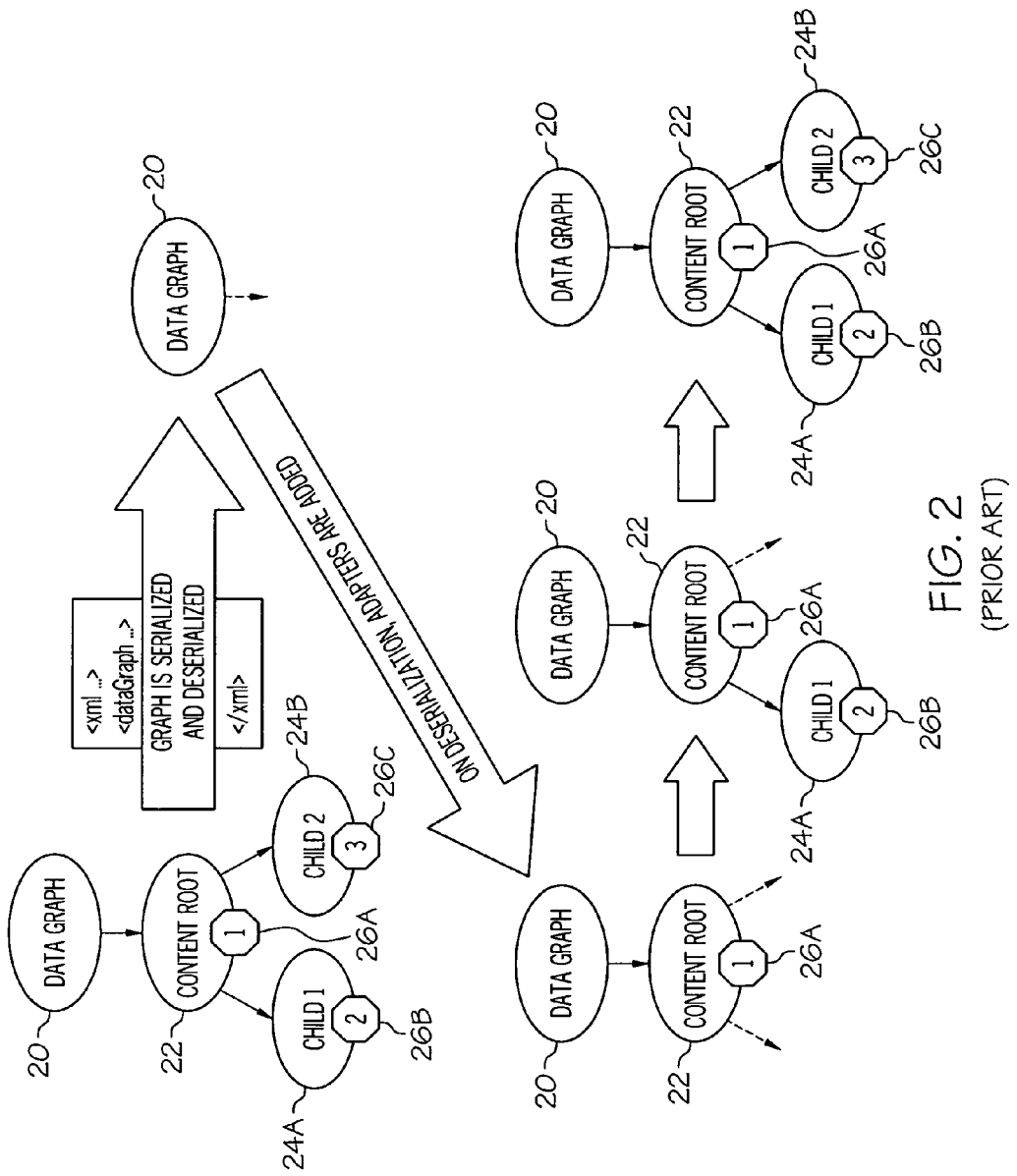
FIG. 2 depicts the association of adapters with data objects in accordance with the prior art.

Referring to FIG. 2, the association of adapters 26A-C with data objects 22 and 24A-B in accordance with the prior art is shown. As shown, data graph 20 includes content root data object and 22 and children data objects 24A-B. Adapters 26A-C are associated with each data object 22 and 24A-B. Within the prior art, there exist straightforward mechanisms for adding these adapters. One such mechanism is to create the adapters upon object instantiation. Thus when the object is created, the adapter is also immediately created and begins listening to object changes. Another example is to adapt all or a subset of objects during processing by a component known in the art as a mediator. Under the prior art involving a distributed or remote environment, data graph 20 would be deserialized into data bits on a server, communicated to a client(s), and then translated back into the data graph. While the data graph was being deserialized on the client, adapters 26A-C would be associated with the data objects. This is further illustrated in FIG. 2, which shows adapters 26A-C being added/associated as each data object 22 and 24A-B is deserialized. Unfortunately, as indicated above, associating adapters 26A-C with data objects 22 and 24A-B during deserialization wastes significant processing time. Specifically, the deserialization process is not only slowed by the actual adapter association, but also by the fact that the adapters 26A-C are active once associated. Such active adapters 26A-C will immediately be able to receive and process modification notifications for their respective data objects 22 and 24A-B.

Shown below is an example of the impact of having adapters present during serialization and deserialization in accordance with the prior art. Take, for example, a scenario where there is a data graph with ten data objects, where each data object has ten single-value properties and two multi-value properties with five values each. During deserialization, the adapters will be invoked once for each property on each object, or 200 times in this case. If the adapter requires five milliseconds of processing time per invocation, almost a second would be lost in deserialization. In a J2EE clustered environment with twenty users, session deserialization can occur hundreds of thousands of times a day and saving a second from each of those deserializations adds up quickly.

Figure 3:
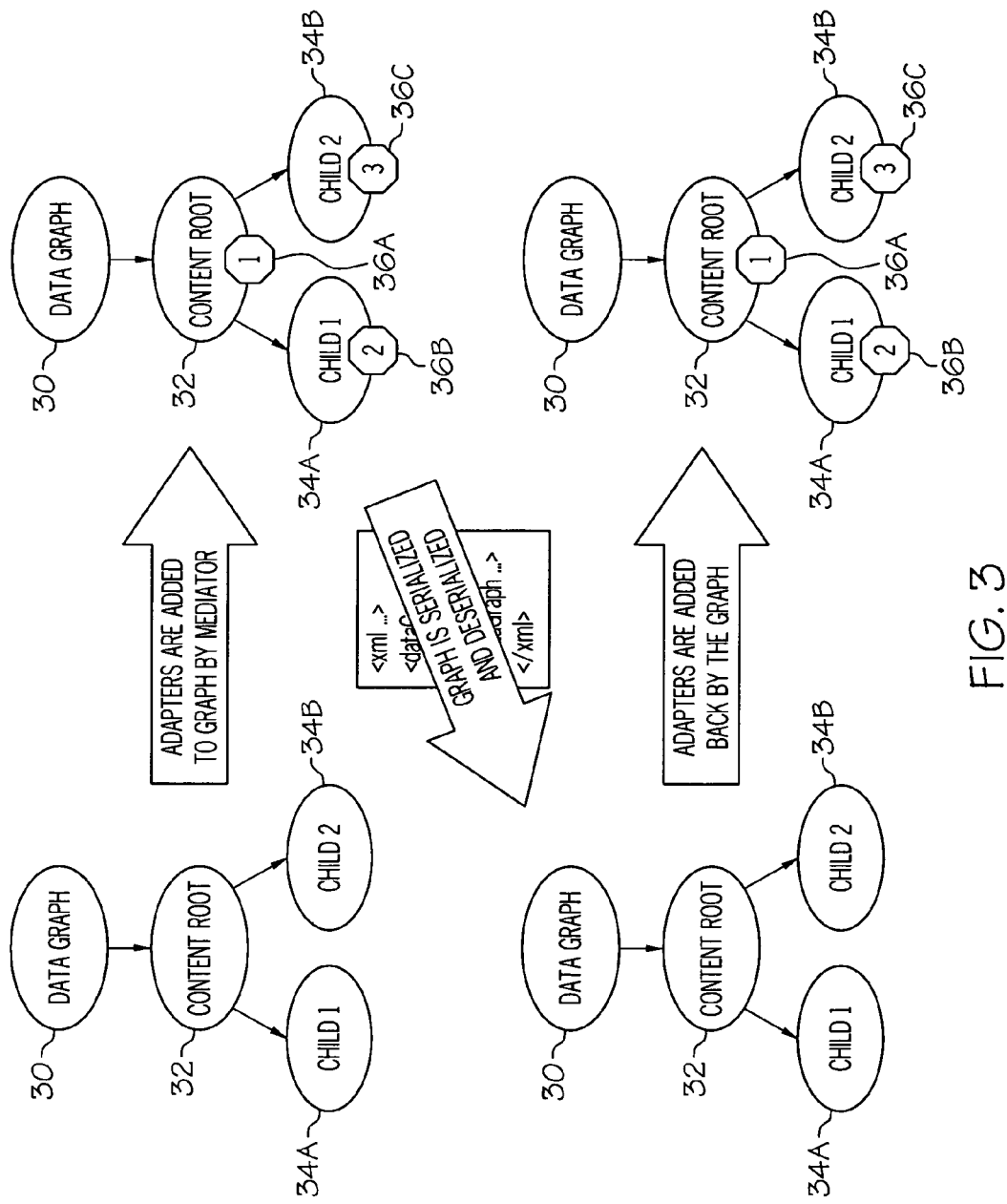
FIG. 3 depicts the association of adapters with data objects in accordance with the present invention.

The present invention addresses these issues by deferring adapter association and activation until the data graph is entirely deserialized. Referring to FIG. 3, the teachings of the present invention are illustrated. As shown, data graph 30 has content root data object 32 and children data objects 34A-B. Once data graph 30 is generated, adapters 36A-C are associated with data objects 32 and 34A-B. Thereafter, data graph 30 can be serialized and deserialized. As indicated above, in a distributed or remote environment, this involves translating data graph 30 into (data) bits on a server, communicating the bits to a client, and then translating the bits back into data graph 30 on the client. Under the present invention, a specialized data graph implementation on the client will associate adapters 36A-C with data objects 32 and 34A-B, after data graph 30 has been entirely deserialized. This is in contrast to previous approaches where adapters were added while the data graph was being deserialized. The approach of the present invention avoids the processing overhead involved with adding adapters during the deserialization operation, as well as the processing overhead involved with having active adapters that must receive and processes modification notifications during the deserialization operation.

In general, the mechanism for providing the optimization of the present invention includes an optimized data graph mechanism combined with a series of adapter patterns that work in conjunction with each other. As described above, one core idea of the invention is to provide a mechanism that defers the adapter processing until after deserialization. However, in order to get the optimal performance benefit, the adapters must not actually be present on data graph 30 so that they are not even invoked during deserialization. The first step in this process is to implement a specialized data graph 30. The specialized data graph 30 will override the default serialization of data graph 30 to provide a method to re-register adapters after data graph 30 has been completely deserialized. The second portion of this process is to augment the adapter processing to be independent of the timing with which it is called. Adapters 36A-C should be able to process changes independent of the current graph state so that they can be invoked at any point in the graph lifecycle. In the preferred embodiment, adapters 36A-C become self-synchronizing and defer computations of all values until needed. This allows the processing to be deferred until actually needed, and avoids the processing "hit" at the end of deserialization when adapters 36A-C are re-added to data graph 30.

Figure 4:
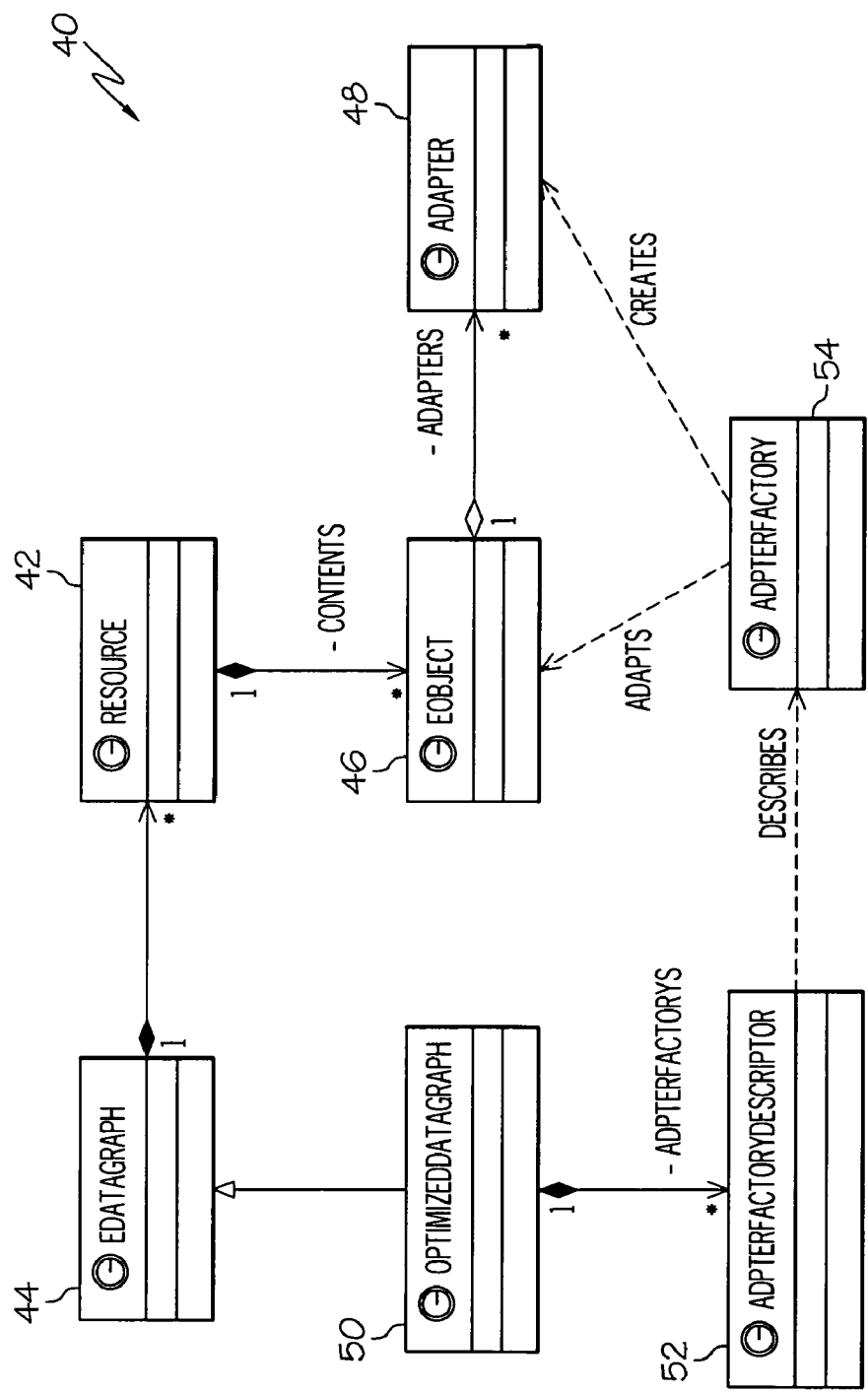
FIG. 4 depicts an object model showing objects in an object-oriented system, in accordance with one embodiment of the present invention.

FIG. 4 depicts an object model 40 showing objects in an object-oriented system according to the present invention. As shown, a distributed application loads a data graph 44, which is a hierarchical representation of data objects 46. The data graph 44 internally stores the data objects 46 in one or more resources 42. In object model 40, one or more adapters 48 are associated, after deserialization, with each data object 46. As shown, each adapter 48 is created by an adapter factory 54 based on a corresponding adapter factory descriptor 52. In general, optimized data graph 50 is a specialized type of data graph. The optimized graph 50 maintains/stores a list of adapter factory "descriptors" 52. The adapter factory descriptors 52 describe one or more adapter factories 54 that should be created after deserialization is complete, and associated with the data graph 50.

Figure 5:
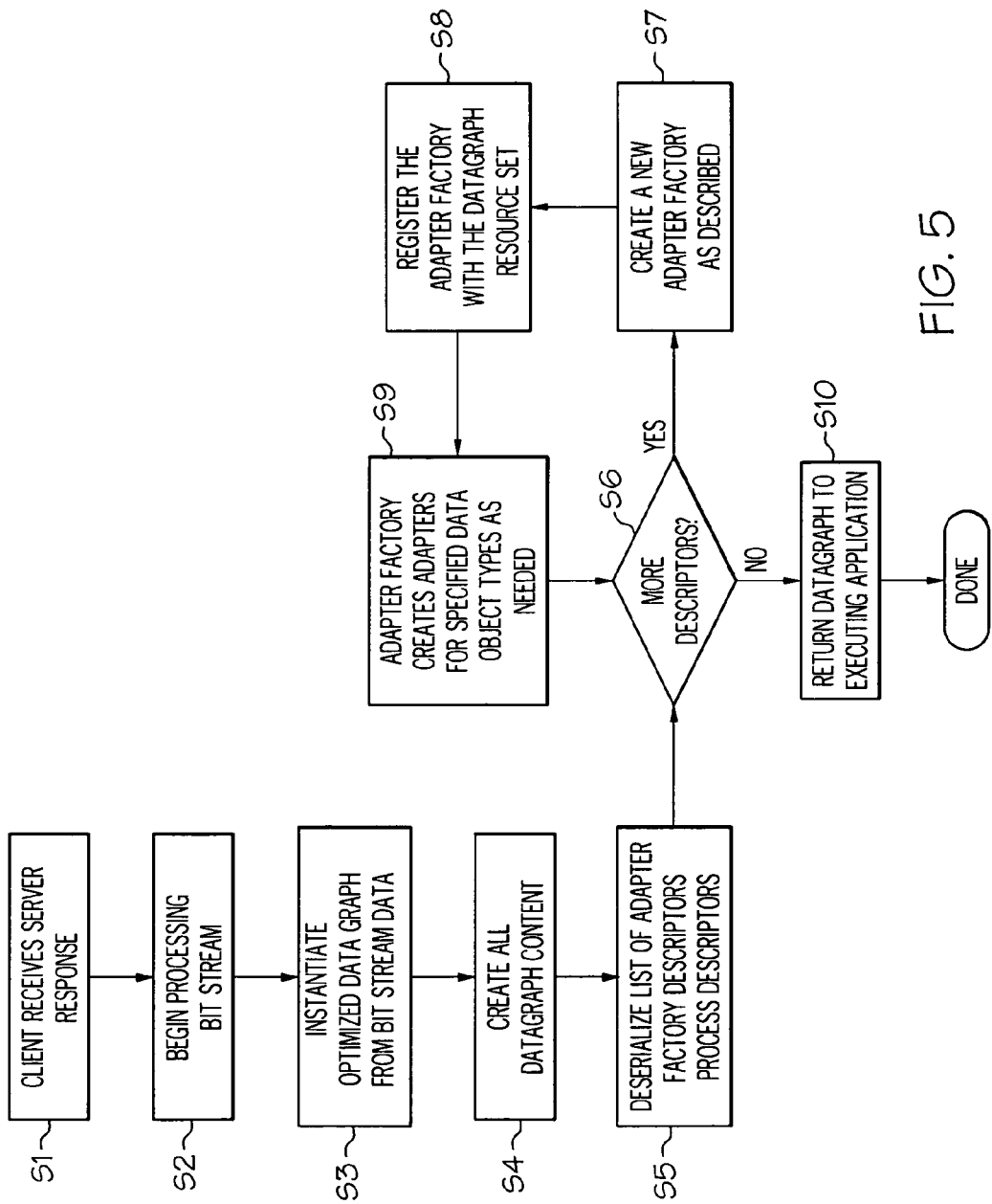
FIG. 5 depicts a flow chart showing the creation of adapters after data graph deserialization in accordance with the present invention.

Referring now to FIG. 5, a flow chart describing the creation of adapters after graph deserialization between a client and server is depicted. As shown, in step S1, the client receives a server response in the form of a bit stream. In step S2, the client begins processing the bit stream, and in step S3, the optimized data graph is instantiated from the bit stream. In step S4, all data graph content is created, and in step S5, a list of adapter factory descriptors is deserialized and processed. As indicated above, the adapter factory descriptors are stored in the data graph. In step S6, it is determined whether more descriptors exist. If so, a new adapter factory is created as described in step S7. In step S8, the adapter factor is registered with the data graph resource set, and in step S9, the adapter factory creates adapters for specified data object types as needed. Once it is determined that no more descriptors exist, the data graph is returned to the executing application in step S10.

Figure 6:
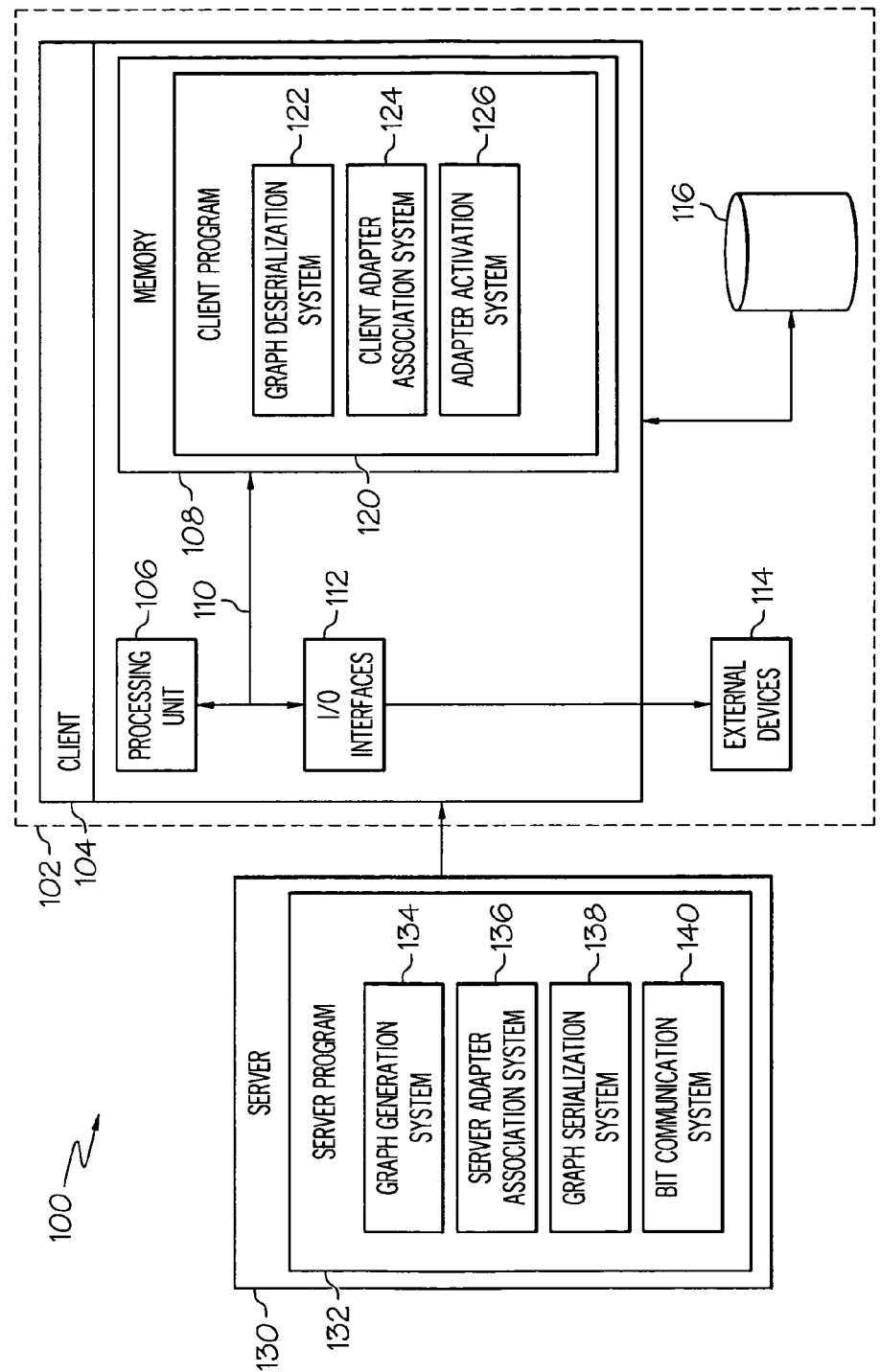
FIG. 6 depicts a more specific computerized implementation in accordance with the present invention.

Referring now to FIG. 6, a more detailed diagram of a distributed or remote implementation 100 of the present invention is shown. As depicted, implementation 100 includes a client 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to manage adapter association for data objects of a data graph.

As shown, client 104 includes a processing unit 106, a memory 108, a bus 110, and input/output (I/O) interfaces 112. Further, client 104 is shown in communication with external I/O devices/resources 114 and storage system 116. In general, processing unit 106 executes computer program code, such as client program 120, which is stored in memory 108 and/or storage system 116. While executing computer program code, processing unit 106 can read and/or write data to/from memory 108, storage system 116, and/or I/O interfaces 112. Bus 110 provides a communication link between each of the components in client 104. External devices 114 can comprise any devices (e.g., keyboard, pointing device, display, etc.) that enable a user to interact with client 104 and/or any devices (e.g., network card, modem, etc.) that enable client 104 to communicate with one or more other computing devices such as server 130.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process steps of the invention. Moreover, client 104 is only representative of various possible computer systems that can include numerous combinations of hardware. To this extent, in other embodiments, client 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external devices 114. Still further, it is understood that one or more additional components (e.g., system software, math co-processing unit, etc.) not shown in FIG. 6 can be included in client 104. However, if client 104 comprises a handheld device or the like, it is understood that one or more external devices 114 (e.g., a display) and/or storage system(s) 116 could be contained within client 104, not externally as shown.

Storage system 116 can be any type of system (e.g., a database) capable of providing storage for information under the present invention such as data bits, data graphs, data objects adapter data, etc. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). Although not shown, additional components, such as cache memory, communication systems, system software, etc., may be incorporated into client 104.

It should be understood that although not shown for brevity, server 130 will also include computer components similar to client 104. In addition, although not shown, server 130 could be implemented within infrastructure 102 in addition to or in lieu of client 104.

Shown in memory 108 of client 104 is client program 122, which includes graph deserialization system 122, client adapter association system 124, and adapter activation system 26. Also, shown loaded on server 130 (e.g., in memory) is server program 132, which includes graph generation system 134, server adapter association system 136, graph serialization system 138, and bit communication system 140. It should be understood that although not shown, other programs such as components of a distributed application, will be loaded on server 130 and client 104.

In any event, assume that the distributed application (not shown) utilizes some body of data. Graph generation system 134 will generate a data graph of data objects on server 130. As indicated above, the data graph is typically a hierarchical structure in which each data object represents a piece of data such as an electronic folder or file. In any event, server adapter association system 136 will generate and/or associate an adapter with each data object. To this extent, server adapter association system 136 can be a standard mediator that generates and associates adapters with data objects (e.g., and stores adaptor factory descriptors in the data graph). Once adapters are associated with the data objects, graph serialization system 138 will serialize the data graph by translating it into data bits. Thereafter, the bits will be communicated by bit communication system 140 to client 104.

Upon receipt, graph deserialization system 122 will deserialize the data graph by translating the data bits back into the data graph. Once the data graph is entirely deserialized, client adapter association system 124 will re-generate/associate the adapters back with the data objects of the data graph. To this extent, client adapter association system 124 is a "specialized" data graph or data graph deserializer that only adds adapters after data graph has been completely deserialized. The adapters can be generated based on creation of one or more adapter factories from the list adapter factory descriptors that are read from the data graph after deserialization. Once the adapters have been associated with the deserialized data graph, adapter activation system 126 will activate the adapters so that modification notifications can be received.

It should be understood that although FIG. 6 depicts a distributed or remote environment implementation, the teachings of the present invention are not limited to such environments. For example the present invention could be implemented on a standalone computer system in which a data graph is serialized and deserialized (e.g., to/from memory, disk, etc.). In such an embodiment, elements of both server program 132 and client program 120 could be implemented as a single program. In such a case, server adapter association system 136 and client adapter association system 124 could be implemented as a single "specialized" data graph or data graph deserializer that performs the functions of the present invention.

While shown and described herein as a method and system for managing adapter association for data objects of a data graph, it is understood that the invention further provides various alternative embodiments. For example, in one embodiment, the invention provides a computer-readable/useable medium that includes computer program code to enable a computer infrastructure to manage adapter association for data objects of a data graph. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 6) and/or storage system 116 (FIG. 6) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to manage adapter association for data objects of a data graph. In this case, the service provider can create, maintain, support, etc., a computer infrastructure, such as computer infrastructure 102 (FIG. 6) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for managing adapter association for data objects of a data graph. In this case, a computer infrastructure, such as computer infrastructure 102 (FIG. 6), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as client 104 (FIG. 6), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for managing adapter association for a data graph of data objects, comprising:
    deserializing the data graph of data objects;
    associating an adapter with each of the data objects only after the data graph is completely deserialized, the adapter being an adapter for a framework; and
    outputting the data objects.

2. The method of claim 1, further comprising:
    generating the data graph; and
    serializing the data graph, prior to the deserializing.

3. The method of claim 2, wherein the generating comprises generating the data graph on a server, wherein the serializing comprises translating the data graph into bits on the server, and wherein the deserializing comprises translating the bits into the data graph on a client.

4. The method of claim 1, further comprising activating the adapters after the associating.

5. The method of claim 1, further comprising creating the adapters using adapter factory descriptors, wherein the adapter framework is an Eclipse Modeling Framework.

6. The method of claim 5, further comprising storing a list of the adapter factory descriptors in the data graph, wherein the adapter factory descriptors describe adapter factories to be created after the deserializing.

* * * * *